United States Patent [19]

Ghosh et al.

[11] Patent Number: 4,672,289

[45] Date of Patent: Jun. 9, 1987

[54] CIRCUIT CONFIGURATION INCORPORATING AN A.C.-FED LOAD CONNECTED IN SERIES WITH A CAPACITOR UNIT

[75] Inventors: Shyamal-Krishna Ghosh, Bad Neustadt; Emil Sturm, Niederlauer, both of Fed. Rep. of Germany

[73] Assignee: Siemens Aktiengesellschaft, Fed. Rep. of Germany

[21] Appl. No.: 889,990

[22] Filed: Jul. 24, 1986

[30] Foreign Application Priority Data

Jul. 26, 1985 [DE] Fed. Rep. of Germany ....... 3526849

[51] Int. Cl.[4] .............................................. H02D 1/44
[52] U.S. Cl. .................................... 318/817; 318/816; 320/1
[58] Field of Search ............... 318/816, 817, 729, 794, 318/795; 361/328, 275, 15, 16; 323/370, 324; 307/109, 108, 110, 146; 363/101; 320/1

[56] References Cited

U.S. PATENT DOCUMENTS

| 3,041,501 | 6/1962 | Willits | 361/16 |
| 3,303,402 | 2/1967 | Martin | 318/795 |
| 3,432,738 | 11/1969 | Jensen | 307/110 |

Primary Examiner—David Smith, Jr.
Attorney, Agent, or Firm—Jack R. Penrod

[57] ABSTRACT

A circuit arrangement in which an a.c. load is connected in series with a capacitor unit suitable for a.c. connection. In such a circuit arrangement, the use of capacitors suitable for d.c. operation is made possible by the fact the capacitor unit is made up of two polar capacitors which are connected in series with the load in such a way that the capacitors are interconnected with matching poles, either directly or by way of the load with matching poles, as well as by the fact that a rectifier diode is connected to each capacitor, with the cathode of the rectifier diode being connected to the positive pole of the respective capacitor and the anode being connected to the negative pole of the respective capacitor.

2 Claims, 2 Drawing Figures

CIRCUIT CONFIGURATION INCORPORATING AN A.C.-FED LOAD CONNECTED IN SERIES WITH A CAPACITOR UNIT

FIELD OF THE INVENTION

The invention relates to a circuit configuration in which an a.c.-fed load is connected in series with a capacitor unit suitable for a.c. connection.

BACKGROUND OF THE INVENTION

Common applications for a.c. capacitor circuits include startup and operation of split-phase induction motors. In such applications, a starting winding is normally used to series-connect an electrolytic capacitor of a type suitable for a.c. operation. Electrolytic capacitors of said type are capable of sustaining only momentary loads and consequently, their use is limited to startup. In the event that the starting winding is to be connected in series with a capacitor during operation as well, the electrolytic capacitor serving as a startup capacitor must be supplemented by an additional metal foil and paper or other type capacitor which is suitable for continuous a.c. operation. Such capacitors at the capacitance values and operating voltage values required are very costly.

SUMMARY OF THE INVENTION

It is an object of this invention is to provide a capacitive circuit arrangement using capacitors which are normally suitable only for d.c. operation in operation with an a.c. load. It is a further object of this invention to provide a capacitive arrangement in which polar electrolytic capacitors can be used continuously with an a.c. load thereby reducing cost and complexity of the circuit.

Brieflly stated, in accordance with one aspect of the invention, the foregoing objects are achieved by providing a circuit arrangement having a capacitive unit for a.c. operation connected in series with an a.c. load including two polar, electrolytic capacitors as part of said capacitive unit, connected in series on the same side of said a.c. load with opposite directions of polarity, and a rectifier diode connected in parallel with each of said capacitors respectively and having the forward direction of each respective diode be opposite to the positive polarity of each respective capacitor.

In another aspect of the invention, the same foregoing objects are also achieved by providing a circuit arrangement having a capacitive unit for a.c. operation connected in series with an a.c. load, including two polar electrolytic capacitors as part of said capacitive unit, connected in series on opposite sides of said a.c. load with opposite directions of polarity, and a rectifier diode connected in parallel with each of said capacitors respectively and having the forward direction of each respective diode be opposite to the positive polarity of each respective capacitor.

In both of these said capacitive unit circuit configurations, the capacitors are alternately charged by the respective half-wave of the alternating current only in the one direction which corresponds to the respective capacitor polarity. During the other half-wave which is opposite to their respective polarity the capacitors are shunted by the forward biased rectifier diode. Consequently, during each half-wave of the alternating current, one capacitor is active, with the result that a phase-shifted alternating current flows within the load. If the starting winding of a split-phase induction motor is used as load, then it is the phase shift of the current brought about by the capacitors in the starting winding with reference to the current in the main winding which ensures the rotating field required for motor startup.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiments taken in conjunction with the accompanying drawings in which:

DESCRIPTION OF A PREFERRED EMBODIMENT

Figure 1:
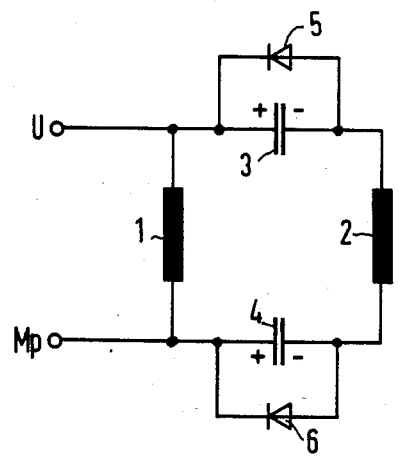
FIG. 1 is a schematic diagram of a circuit arrangement in which the capacitors are interconnected by way of the starting winding of a split-phase induction motor.

In the circuit configuration per FIG. 1, the main winding 1 of the split-phase induction motor is connected to the power terminals U and $M_P$. Furthermore, a series circuit, made up of the starting winding 2 and two polar capacitors 3 and 4, is connected to the power terminals U and $M_P$ parallel to the main winding 1. In this circuit arrangement, the starting winding 2 is connected between the two-polar capacitors 3 and 4, whereby the two capacitors 3 and 4 with matching poles, as shown in the drawing each with its negative pole, are interconnected by means of the corresponding terminal of the starting winding 2. The other matching poles, i.e., positive poles, of the capacitors 3 and 4 are connected to the power terminals U and $M_P$. A further option involves adding a circuit breaker to the starting winding circuit to permit the starting winding 2 to be switched off during operation, should this be desired.

Figure 2:
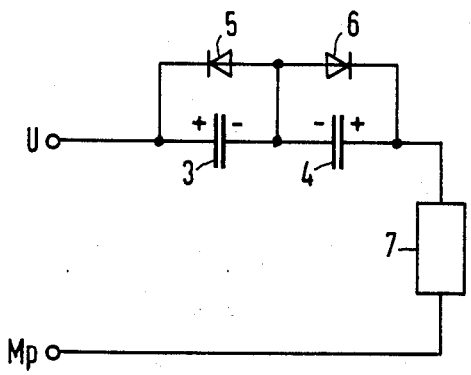
FIG. 2 is a schematic diagram of a circuit arrangement in which the capacitors are directly interconnected.

According to the circuit arrangement shown in FIG. 2, the two capacitors 3 and 4 are directly interconnected by way of their negative poles and are connected in series with any desired a.c. load 7. The capacitors 3 and 4 can also be interconnected directly by way of their positive poles. Naturally the starting winding 2 of the induction motor may also serve as the a.c. load.

In each of the circuit variants shown, a rectifier diode 5 or 6, respectively, is connected in parallel with each of the polar capacitors 3 and 4 in such a way that the anode of the respective rectifier diode 5 or 6 is connected to the negative pole of the respective capacitor 3 or 4, while the cathode of the respective rectifier diode 5 or 6 is connected to its positive pole.

The circuit arrangement according to FIG. 1 operates as follows: During the positive half-wave of the applied alternating current, the capacitor 3 is charged, whereby the charging current flows through the starting winding 2 and the rectifier diode 6 to the power terminal $M_p$. The capacitor 4 is charged by the subsequent negative half-wave, and the charging current now flows in the opposite direction through the starting winding 2 and through the rectifier diode 5 to power terminal U. Simultaneously, the capacitor 3 is discharged by the line voltage to permit it to be recharged during the subsequent positive half-wave. During said subsequent positive half-wave, the other capacitor 4 discharges; during the subsequent negative half-wave, the latter is recharged. As indicated by the explanation, an alternating current flows within the starting winding. As a result of the capacitive action on the part of the capacitors 3 and 4, said a.c. current is characterized by a phase-shift with reference to the current flowing within the main winding 1; as a result, a rotating field can be produced In the circuit arrangement according to FIG. 2, the capacitor 3 is likewise charged during the positive half-wave of the alternating current. The charging current then continues to flow through the rectifier diode 6 to the load 7 as well as to power terminal $M_p$. During the negative half-wave the other capacitor 4 is charged, whereby the current flows from power terminal $M_p$, by way of the load 7, the capacitor 4 and the rectifier diode 5 to power terminal U. At the same time, capacitor 3 discharges during the negative half-wave. Discharging of capacitor 4 then occurs during the subsequent positive half-wave.

Due to the above-described parallel connection of rectifier diodes 5 and 6, capacitors 3 and 4 are always charged exclusively in the direction which corresponds to their particular polarity, and are always discharged during the half-wave opposite to their polarity, preventing charge reversal; capacitors 3 and 4 will only charge and discharge, permitting the use of polar capacitors suitable for d.c. operation. Said capacitors are considerably less expensive than corresponding metal foil and paper capacitors suitable for a.c. continuous operation. When said polar capacitors of proper rating are used, they may be kept in continuous operation, which eliminates the necessity of separate capacitors for startup and operation in induction motors.

It will now be understood that there has been disclosed an improved system for connecting polar electrolytic capacitors to an a.c. load. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters patent of the United States is:

1. A circuit arrangement having a capacitive unit for a.c. operation connected in series with an a.c. load comprising:

two polar electrolytic capacitors as part of said capacitive unit, connected in series on the same side of said a.c. load with opposite direction of polarity; and a rectifier diode connected in parallel with each of said capacitors respectively and having the forward direction of each respective diode be opposite to the positive polarity of each respective capacitor.

2. A circuit arrangement having a capacitive unit for a.c. operation connected in series with an a.c. load comprising:

two polar electrolytic capacitors as part of said capacitive unit, connected in series on opposite sides of said a.c. load with opposite direction of polarity; and a rectifier diode connected in parallel with each of said capacitors respectively and having the forward direction of each respective diode be opposite to the positive polarity of each respective capacitor.

* * * * *